Figure 1:
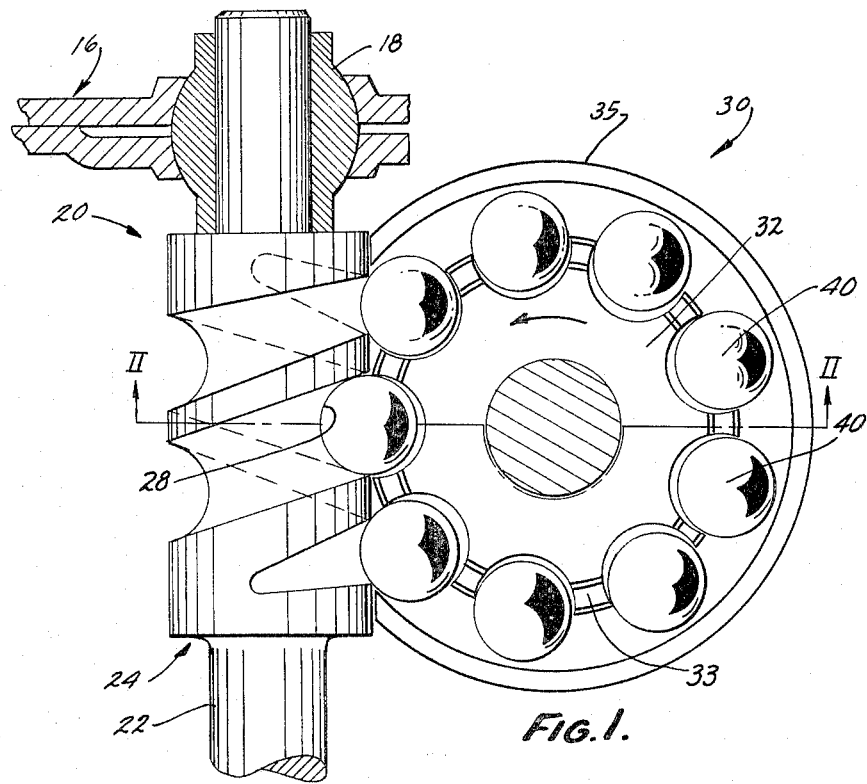

Sept. 27, 1966  J. L. JONES  3,274,847
TRANSMISSION
Filed Feb. 24, 1964

INVENTOR.
JOHN L. JONES
BY Price & Heneveld
ATTORNEYS

United States Patent Office 3,274,847
Patented Sept. 27, 1966

3,274,847
TRANSMISSION
John L. Jones, 231 Diana Ave., Muskegon, Mich.
Filed Feb. 24, 1964, Ser. No. 346,984
10 Claims. (Cl. 74—425)

This invention relates to force-transmitting mechanisms, and more particularly to relatively small, lightweight, and high-speed devices for transmitting rotary movement from a driving to a driven mechanism.

A great number of rotary movement transmitting devices, commonly called transmissions, have by now become well known to those skilled in the mechanical arts. These many devices vary both in size and in kind over a considerable range, depending upon the type of duty they are to perform. All such devices involve the principle of speed reduction in at least some of its broader aspects, however, and in the field of compact and miniaturized tools and equipment this principle becomes paramount. That is, mechanical power produced by such devices is maximized through the greatest possible ratio of input to output speed, so that the actual physical size of the instrumentality may be reduced to a minimum. In striving toward this end the industrial maxims of economy and efficiency are also required to be observed, so that the devices must be as simple as possible and have as few stages of speed reduction as possible.

Now, it is known to the mechanical arts that a helical, or worm-type gear is one way in which to maximize speed reduction and thereby produce great mechanical advantage. It was heretofore impossible, however, to utilize a worm type of driving member in high speed machinery, since even the finest gears would overheat and fail in a very short time when driven by a high-speed worm, and no other type of driven member was known which was more satisfactory in practice than were gears. Thus, worm drives were generally found only in very slow moving and ponderous equipment, where they were mated with such as gears and racks, while high speed equipment was required to include multiple and complex speed reducing gearing stages.

The present invention recognizes that the worm is an ideal driving member for high speed transmissions; recognizes also that the major difficulty productive of the previous wide-spread failure in attempts to utilize this form of speed reduction resides within the inherent friction of sustained sliding contact; and provides a most desirable and efficacious solution of this problem in the creation of a transmission mechanism having an ingenious driven member which utilizes substantially all rolling contact with the driving worm, thereby making available a device previously totally unknown, which in a single stage will produce practically limitless speed reduction.

The objects of this invention and the advantages made available thereby will thus be seen to be very great in number, and include, for example: a high-speed rotary transmission having a worm for a driving member and a member driven by the worm which utilizes any of a wide variety of possible rollable members, such as balls, rollers and the like;

A single stage speed reducing unit capable of very great speed reductions at high levels of efficiency;

A transmission of this nature, the elements of whose driven member which are engaged by the driving worm may readily be caused to follow any desired motion, whether circular or other, and without regard to the irregularity of the desired motion; and The provision of a transmission embodying all of the above features, and yet which is compact, lightweight, economical to manufacture, efficient to operate, easy to maintain, which requires little care, and which lends itself most readily to the present-day requirements of miniaturization.

Figure 2:
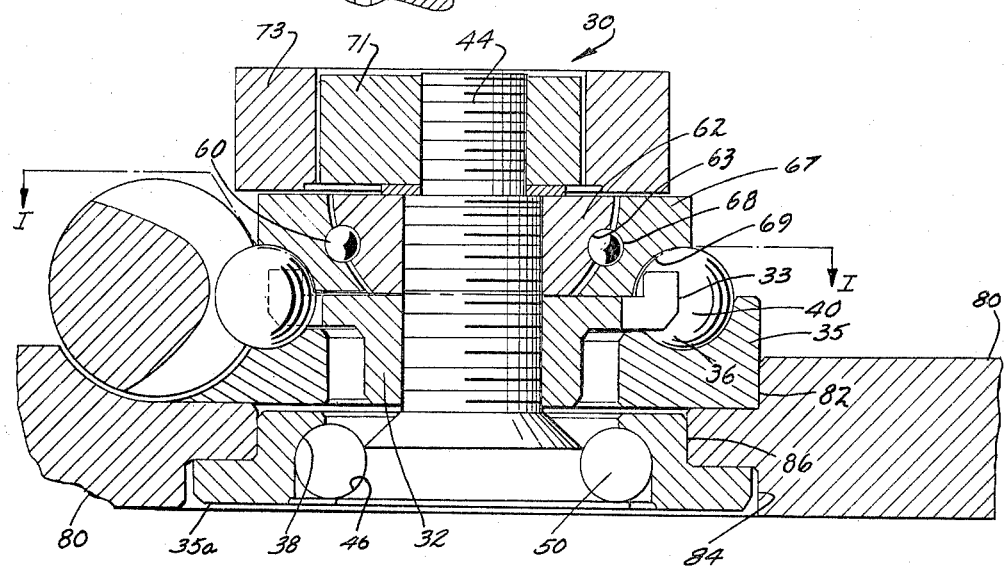

Other objects and advantages of this invention may well be suggested to those skilled in this art upon examination of the following specification, taken in conjunction with the accompanying drawings, wherein:

FIG. 1 is a plan view, partially in section, taken through the compound horizontal section I—I of FIG. 2, and FIG. 2 is an elevational view taken through the compound vertical section II—II of FIG. 1.

Briefly, this invention consists of solving the problem of utilizing a helical or worm-type drive in a high speed transmission mechanism, and thereby taking full advantage of the very great speed reduction and torque capabilities inherent in this type of drive, which problem the inventor believes never to have been successfully solved heretofore. The solution is provided by means of a unique and inventive driven member, which utilizes rollable bearing elements such as ball or rollers as the means which are contacted and driven by the worm. These bearing elements in turn are made to drive a caging means, which also serves to space the bearing elements and coordinate their movements in the region where they are to be engaged by the worm groove. The caging means then transfers the motion imparted to it by the bearings to a centrally-disposed force-transmitting structural member, from which the force or motion may be coupled to the external equipment desired to be driven. In a preferred embodiment of the invention the driven member consists of a ball bearing unit having three different sets of balls, all of which follow circular paths dictated by concave ball tracks in which they rest. The balls in one of the sets are caged and are driven by the worm, and are used to drive the central cone member, while the other two sets of balls fulfill a more conventional bearing function, described in more detail hereinafter.

Referring now in detail to my transmission device, as the same is depicted in the drawings, in FIG. 1 the transmission is seen to be composed primarily of a worm 20 and a driven member 30. The worm 20 comprises a shaft 22, which carries a cylindrical portion 24 having a continuous helical groove 28 formed thereon. The shaft 22 is driven at one end by conventional driving means (not shown), whose output power is desired to be transmitted. At its other end, the shaft is journaled in a support mechanism 16 of any desired design, which includes bushing means 18.

The driven member 30 comprises a ball assembly having a plurality of balls 40 which engage the helical groove 28 of the worm 20, and are driven thereby in a rotary fashion upon an outer race means 35. The balls 40 are spaced from each other by a caging means 32 having a series of finger portions 33 which extend radially of the center of the member 30 between each of the balls 40, the furthest extremity of each of the finger portions 33 being preferably just short of reaching the center of the associated balls. As seen in FIG. 1, when the form 20 engages the balls 40, the balls enter the generally circular groove 28, which progresses helically about the periphery of cylindrical portion 24. The groove 28, during the brief period in each revolution of the driven member 30 when a single given ball 40 is actually engaged by the worm, thus takes the place of the portion of the race means 35 which horizontally retains the balls during the remainder of each of their revolutions. Accordingly, this portion of the race 35 is removed so as not to interfere with the action of the worm 20 in engaging and receiving the balls in a sequential manner, as they are driven around the race 35.

It should here be stressed that only one particularly desirable embodiment of this invention is illustrated in the drawings and discussed in detail here, in order to clearly delineate my inventive concept. Many modifications of the driven member 30 are entirely possible, including such as a long string of ball members which might be spaced and coordinated by any of a variety of caging means, such as chains or the like, and which might travel in a variety of motions much less regular than the circular motion herein described. Also, such motion might well be utilized in ways other than the turning of a centrally-disposed member.

In the preferred embodiment shown in the figures, the structure of the driven member 30 is shown in great detail in FIG. 2, where it will be seen that the outer race means 35, mentioned previously, has a cross-section that includes a generally concave groove 36, in which ride the balls 40. The outer race 35 encircles a shaft-like force-transmitting inner structural member 44, the circular periphery of whose bottom extremity is formed so as to include a concave ball track 46. The lowermost extremity 35a of the outer race means 35 (which may if desired be a separate member which merely abuts the upper portion of the race) is formed so as to have an inwardly-directed circular concave ball track way 38, which cooperates with the surface 46 of the structural member 44 to define an annular chamber therebetween, in which is positioned a second set of ball elements 50.

The caging means 32 is preferably threadedly engaged upon the structural member 44 in a secure manner, with the finger portions 33 of the caging means extending radially outward between each of the balls 40, thus separating them one from the other. Threaded upon the structural member 44 immediately above and adjacent the caging means 32 is a cone member 62, which has a circular groove 63 of generally rounded cross-section formed about its perimeter. The caging means 32 and the cone member 62 are preferably distinct and separate pieces which are each threaded upon the structural member 44. If desired, however, these two pieces may be combined into a single element of the same configuration.

An intermediate race means 67 encircles both the structural member 44 and the cone member 62, immediately outside the latter and closely adjacent thereto. The intermediate race member 67 has both an inwardly directed and an outwardly directed concave groove formed therein, denominated 68 and 69, respectively. The inwardly directed groove 68 is formed so as to cooperate with the groove 63 of the cone member 62, thereby forming an annular retaining chamber, in which is positioned a third set of ball elements 60. The outwardly directed groove 69 of the intermediate race means 67 is formed so as to cooperate with the concave groove 36 in the outer race means 35, thereby forming an annular chamber which accommodates the driven ball members 40, described previously.

At its upper extremity, the threaded inner structural member 44 affords a ready method of coupling the rotary motion of the driven member 30 of the transmission to a desired external driven unit. Coupling of this motion may be effected by threadedly engaging upon the member 44 a force-coupling means such as the cam 71. The cam will be rotated by the motion of the member 44, and a conventional cam follower means, such as the yoke 73, may be utilized to interconnect the external driven unit and the cam. Many possible ways of securely positioning the ball assembly of the driven member 30 in fixed relation to the driving worm 20 will likely be apparent, but a preferred method is to insert the two portions 35 and 35a of the outer race means into concentric holes such as 82, 84, and 86, formed in the housing material 80 of the device in which the transmission is to function.

Operation

Having fully and completely described my invention, the manner of its operation is as follows. A source of rotary mechanical energy (not shown) is attached to one end of the shaft 22 of worm assembly 20, the other end of whose shaft is journaled in conventional bushing means 18 secured by any desired support means such as 16. A cylindrical portion 24 having a helical groove 28 of generally circular cross section is formed on or attached to the worm shaft 22, so as to be rotated with the shaft by the external means. A driven member 30 constituting a ball bearing assembly is fixedly secured closely adjacent the worm 20 so that a plurality of balls 40 will be successively engaged by the helical groove 28 and will be driven by the worm in a rotary manner, around an annular ball-retaining track formed by the cooperation of grooves 36 and 69, which are formed in the outer race means 35 and the intermediate race means 67, respectively. As the balls 40 are thus driven in their circular pattern, they in turn drive the caging means 32 in the same direction and at the same speed, by means of finger portions 33 formed on the caging means 32 which extend between each of the balls and serve to separate them and to coordinate their movement. The caging means 32 is secured to the shaft-like inner structural member 44, and thus this member and every element affixed to this member, including the cone member 62 and the force-coupling cam means 71, are all driven in a rotary fashion.

As the member 44 is rotated, it is steadied and supported by the lower set of ball members 50, which ride between the surface of the concave track 46 formed on the base of the member 44 and the surface of the cooperating concave track 38, formed upon the lower extremity 35a of the outer race 35. Additional stability is given the member 44 by the upper set of ball elements 60, which serve to distribute the weight of the member 44, as well as that of all the members attached thereto, upon the intermediate race means 67, which in turn distributes this weight upon the driven ball elements 40, which must support it. Thus, although the caging means 32 and its finger portions 33 are entirely independent of the outer race means 35, so that the driven balls 40 may drive the same with a minimum of frictional resistance, the caging means is nonetheless supported and aligned in an indirect manner by the driven balls 40.

While the outer race means 35 may optionally be two pieces or a single integral piece, and while the caging means 32 and the cone member 62 may if desired be a single unit, and while either or both the caging means and cone member may be integral with the inner structural member 44, elimination of the upper group of ball members 60 by combining the cone member 62 and the intermediate race means 67 into a single integral piece is definitely not advised. This is true since a differential exists between the speed at which the balls 40, while being driven by the worm 20, roll upon the outer race 35 and the speed at which the intermediate race means 67 would contact the top of the balls 40 if the race 67 were driven directly by the inner structural member 44. If this situation were true, the balls 40 would have to slide as well as roll between these two surfaces, thus greatly increasing friction and its undesirable attributes of heating and drag.

The speed differential noted is reduced to a practical nullity through the use of the third or upper set of ball members 60, whose rolling motion between the cone member 62 and the intermediate race means 67 effectively absorbs this difference and renders the speed at which the race means 67 and the balls 40 are moved about the member 44 very nearly equivalent, while at the same time helping to support and align the member 44. Thus, the cone member 62, the ball bearings 60, and the intermediate race 67 may be thought of collectively as a means acting between the balls 40 and the inner member 44 for effectively eliminating a differential in speed therebetween.

It should here be pointed out that the motion imparted to each individual ball 40 through the interaction of the surfaces against which the balls roll and the driving contact of each ball against the worm 20 is calculated to continually turn each ball sideways at the same time that it is being rolled forward around its circular path. Thus, each of the balls 40, which sustain the greatest stress during operation of the transmission, is actually subjected to a polishing rather than a wearing motion, since each point of rolling contact between each ball and the surfaces against which it rolls is constantly being changed. The sphericity of each ball is thus insured, even after the most rigorous and prolonged usage.

The operation of my transmission is completed by coupling the rotary motion of the inner structural member 44 to an external means (not shown) desired to be driven. This is primarily a matter of design preference, but a preferred method of coupling utilizes a cam means 71, which is affixed to the member 44 and thus turns in unison with it. The eccentric rotary motion of the cam may then be converted, through the use of a yoke 73 or other cam follower means, to a reciprocating movement.

One further aspect of the construction involved in my transmission remains to be noted. Although it is not essential, the most desirable form for the driving worm is one whose helical groove 28 (FIG. 1) is radially formed. That is, since in the preferred embodiment shown the driven balls 40 follow a circular path about the race 35, the curvature of this path should ideally be reproduced in the helical groove 28, in order to facilitate engagement and disengagement of the balls by the worm. More precisely, the locus of points connecting the innermost extremity, or base, of the groove 28 describes a generally circular figure. While it is true that this represents only a preferred embodiment of the worm, and while a worm having a common configuration (i.e., one whose locus is parallel to the axis of rotation) may be used if desired, an ordinary or "straight" worm must necessarily be less satisfactory, since it will necessitate that each ball 40 "drop," or travel without restraint, a distance equal to the depth of the groove 28 as the ball leaves the race 35 of the assembly 30 and becomes engaged by the groove, resulting in unnecessary shock and stress.

As indicated variously through this description of my invention, the inventive concept involved herein exceeds the particularities of the structures shown and described, and although these structures are a preferred embodiment of the concept underlying them, they are far from being the only such embodiment. Accordingly, I do not wish to be limited to merely this structure, but only as is expressly set forth in the below-appended claims.

I claim:

1. A transmission mechanism, comprising: a worm; a member driven by said worm, said member including, a continuous surface and a plurality of elements sequentially rollable upon said surface; and means for securely positioning said worm and said driven member closely adjacent each other, whereby the worm sequentially engages and drives each of said rollable elements to thereby drive said driven member.

2. A transmission mechanism, comprising: a worm; a member driven by said worm, said member including a plurality of ball elements and means for spacing said balls; and means for securely positioning said worm and said driven member closely adjacent each other, whereby the worm engages and drives the ball elements of said driven member.

3. A transmission mechanism comprising: a worm; a member driven by said worm, said member including a plurality of balls and a caging means for spacing said balls and coordinating their motion; means for securely positioning said worm and said driven member closely adjacent each other, such that the worm engages and drives the balls of said driven member, which in turn drive said ball caging means; and force-transmitting means operatively connected to and driven by said ball caging means.

4. A transmission mechanism, comprising: a worm; a member driven by said worm, said member including a plurality of balls, a concave ball-retaining track, and a caging means for spacing said balls upon said track and for coordinating their movements thereupon; means for securely positioning said worm and said driven member closely adjacent each other, such that the said worm engages and drives the balls of said driven member upon said ball-retaining track, said balls in turn driving said ball caging means; and force-transmitting means operatively connected to and driven by said ball caging means.

5. A transmission mechanism, comprising: a worm; a member driven by said worm, said member constituting ball bearing means having a circular outer race with a concave ball-retaining track way, having a plurality of balls positioned upon said bearing race track way, and having also an inner structural member with a series of caging fingers extending radially thereof and fixed relative thereto, for spacing said balls upon said track way and coordinating their movements thereupon; means for securely positioning said worm and said bearing means closely adjacent each other, such that the said worm engages and drives said balls, which in turn drive said inner member by said caging fingers; and said inner member providing a force-transmitting means from which the motion of said driven member may be coupled.

6. A transmission mechanism comprising: a worm; a member driven by said worm, said member including a plurality of balls and a caging means for spacing said balls and coordinating their motion; means for securely positioning said worm and said driven member closely adjacent each other, such that the said worm engages and drives the balls of said driven member, which in turn drive said ball caging means; a structural force-transmitting member operatively connected to and driven by said ball caging means; and means acting between said balls and said structural member for effectively eliminating any speed differential therebetween.

7. A transmission mechanism, comprising: a worm; a member driven by said worm, said member including a plurality of balls, a concave ball-retaining track, and a caging means for spacing said balls upon said track and for coordinating their movements thereupon; means for securely positioning said worm and said driven member closely adjacent each other, such that the said worm engages and drives the balls of said driven member upon said ball-retaining track, said balls in turn driving said ball caging means; a structural force-transmitting member operatively connected to and driven by said ball caging means; and means acting between said balls and said structural member for effectively eliminating any speed differential therebetween.

8. A transmission mechanism, comprising: a worm; a member driven by said worm, said member constituting ball bearing means having a circular outer race with a concave ball-retaining track way, having a plurality of balls positioned upon said bearing race track way, and having also an inner cone structural member with a series of caging fingers extending radially thereof and fixed relative thereto, for spacing said balls upon said track way and coordinating their movements thereupon; means for securely positioning said worm and said bearing means closely adjacent each other, such that the said worm engages and drives said balls, which in turn drive said inner member by said caging fingers; said inner member providing a force-transmitting means from which the motion of said driven member may be coupled; and means acting between said balls and said inner member for effectively eliminating any speed differential therebetween.

9. A transmission mechanism, comprising: a worm; a member driven by said worm; said member constituting a ball bearing having a threaded inner structural member terminating at one end in a first concave ball track, there being a first plurality of balls upon said track; said bearing having also an outer race means providing a mounting structure therefor, said means circling said threaded structural member and having a concave inner surface adapted to cooperate with said inner structural member ball track in retaining said first plurality of balls therebetween; and said means also having a second concave ball track, there being a second plurality of balls positioned upon said second ball track; said bearing further having a caging means threaded upon said structural member which includes a plurality of radial fingers extending between and spacing the last-said balls; said bearing having also an inner cone element threaded upon said structural member adjacent said caging means with an outwardly-directed concave ball track formed around its periphery, there being a third plurality of balls positioned upon said cone element ball track; and said bearing having finally an intermediate race member circling said structural member closely adjacent both said inner cone element and said outer race means, said intermediate race member having both an inwardly-disposed concave track cooperating with said cone element ball track in retaining the said third plurality of balls positioned thereupon and an outwardly-disposed concave track cooperating with said outer race means ball track in retaining said second plurality of balls positioned thereupon; said worm and said ball bearing being securely mountable closely adjacent each other, such that the said worm engages and drives the said second plurality of ball retained in the said track between said intermediate race member and said outer race means, which in turn drive said caging means fingers, said threaded structural member, and said cone element all in a rotary motion.

10. A transmission mechanism, comprising: a worm; a member driven by said worm; said member constituting a ball bearing having a threaded inner structural member terminating at one end in a first concave ball track, there being a first plurality of balls upon said track; said bearing having also an outer race means providing a mounting structure therefor, said means circling said threaded structural member and having a concave inner surface adapted to cooperate with said inner structural member ball track in retaining said first plurality of balls therebetween; and said means also having a second concave ball track, there being a second plurality of balls positioned upon said second ball track; said bearing further having a caging means threaded upon said structural member which includes a plurality of radial fingers extending between and spacing the last-said balls; said bearing having also an inner cone element threaded upon said structural member adjacent said caging means with an outwardly-directed concave ball track formed around its periphery, there being a third plurality of balls positioned upon said cone element ball track; said bearing having further an intermediate race member circling said structural member closely adjacent both said inner cone element and said outer race means, said intermediate race member having both an inwardly-disposed concave track cooperating with said cone element ball track in retaining the said third plurality of balls positioned thereupon and an outwardly-disposed concave track cooperating with said outer race means ball track in retaining said second plurality of balls positioned thereupon; and said bearing having finally force-coupling means threaded upon said structural member adjacent said inner cone element; said worm and said ball bearing being securely mountable closely adjacent each other, such that the said worm engages and drives the said second plurality of balls retained in the said track between said intermediate race member and said outer race means, which in turn drive said caging means fingers, said threaded structural member, said cone element, and said force-coupling means all in a rotary motion.

References Cited by the Examiner
UNITED STATES PATENTS

| | | | |
|---|---|---|---|
| 781,600 | 1/1905 | Hamachek | 74—426 |
| 3,188,877 | 6/1965 | Schmidt | 74—425 |
| 3,190,138 | 6/1965 | MacChesney | 74—425 |

DAVID J. WILLIAMOWSKY, *Primary Examiner.*

L. H. GERIN, *Assistant Examiner.*